Dec. 3, 1968  F. A. PORSCHE  3,414,318
STORAGE COMPARTMENT IN MOTOR VEHICLES
Filed Oct. 11, 1966
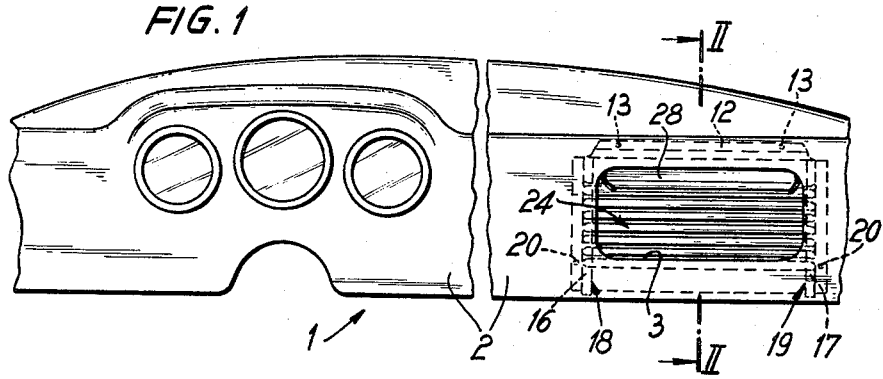
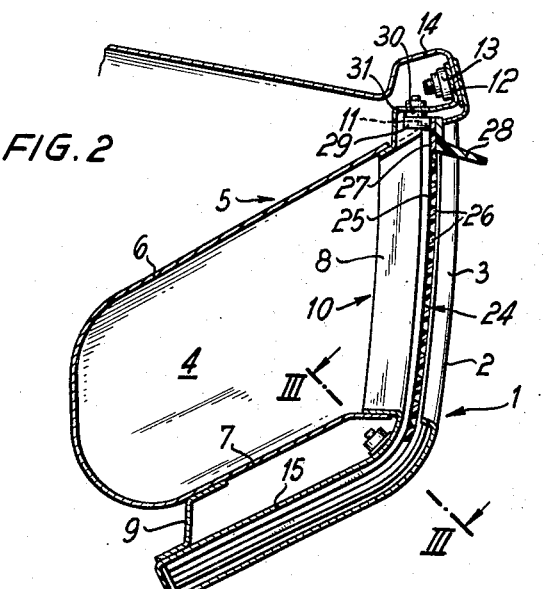
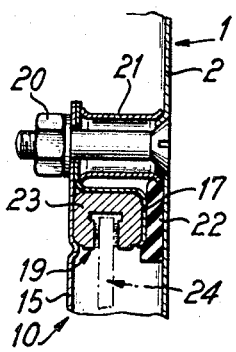
INVENTOR :
Ferdinand Alexander PORSCHE
BY *Dicker + Craig*
ATTORNEYS

United States Patent Office 3,414,318
Patented Dec. 3, 1968

3,414,318
STORAGE COMPARTMENT IN MOTOR VEHICLES
Ferdinand Alexander Porsche, Stylist Doffingen, Kreis Boblingen, Germany, assignor to Firma Dr. Ing. H.C.F. Porsche KG, Stuttgart-Zuffenhausen, Germany
Filed Oct. 11, 1966, Ser. No. 585,808
Claims priority, application Germany, Oct. 15, 1965, P 37,874
3 Claims. (Cl. 296—37)

ABSTRACT OF THE DISCLOSURE

An instrument panel storage compartment provided with a horizontally ribbed synthetic flexible closure slidingly mounted in opposite channel members to be moved between a closed position retained by a magnetic latch and an open position between the cup-shaped compartment walls and a bottom instrument panel shield.

---

In the prior art, it is quite common to provide a storage compartment in the instrument panel of a vehicle passenger enclosure. The storage compartment may be used for small items, for example, gloves, cleaning rags, maps and the like. It is conventional to provide such a storage compartment with a cover or closure that is hinged to the instrument panel or other portion of the vehicle enclosure to enclose the opening of the storage compartment. However, this conventional structure has the disadvantage that when the cover is open it extends into the passenger enclosure so that its relatively sharp edges present a potentially dangerous projection to the passengers in the motor vehicle. The passengers may be thrown against this open cover during an accident, or the cover may be sprung open during an accident to have the same results.

To overcome this prior art disadvantage, it has been suggested to pivotally mount the entire storage compartment to the instrument panel or other vehicle structure. This pivotal mounting would eliminate the dangerous projections but it has the additional disadvantage that a large amount of premium space is required and the mountings are quite expensive.

Summary of the invention

It is an object of the present invention to provide a storage compartment that will overcome the above-mentioned disadvantages. Another object of the present invention is to provide a storage compartment that is safe in that it does not have any dangerous projections at any time. A further object of the present invention is to provide a storage compartment in a vehicle with a sliding cover or closure that will not project into the passenger enclosure at any time.

According to the present invention, the disadvantages that are noted above in regard to the prior art are avoided by providing the opening of a vehicle storage compartment with a slidabe cover that is arranged to move in the general plane of the opening. When the storage compartment is open, the cover will not protrude into the passenger enclosure so that the safety of the passengers is insured. The cover may be advantageously constructed of a single unitary panel comprising a plastic or other synthetic material pliable wall portion with integral reinforcing ribs extending generally perpendicular to the sliding movement of the panel.

The guide means for the sliding panel may be constructed to match the contour of the vehicle frame parts that surround the opening to the storage compartment to provide a pleasing appearance and maximum storage area. By the above structure, the panel may be economically constructed, and its strength is provided by the reinforcing ribs.

The closure panel of the present invention is provided with two oppositetly disposed guide tracks on each side of the storage compartment opening. The storage compartment may be constructed of the cup shaped housing having an annular shield at its forward end. The annular shield may constitute a portion or all of the guide tracks; the guide tracks support and reinforce the walls of the storage compartment, so that additional means for the support and reinforcement of the storage compartment are not necessary as would be required in the prior art structure.

It is contemplated that the storage compartment with its cover and tracks may be a prefabricated subassembly to be installed on new cars or exchanged for the storage compartment on old cars during their repair. This is particularly advantageous, because the structure of the present invention lends itself readily to prefabrication and simplified mounting to a vehicle part, particularly a motor vehicle instrument panel.

It is contemplated that the guide tracks for the closure panel may correspond to the walls forming the opening of the storage compartment. Thus, the panel may be mounted so that in the closed position it will conform to the general contour of the motor vehicle instrument panel. With the closed panel conforming to the contour of the instrument panel and the storage compartment opening, a relatively large storage compartment may be provided within a minimum of space. Also, it is contemplated that one of the reinforcements for the closure panel may extend outwardly to form a handle for the easy opening and closing of the storage compartment closure. The handle may be formed separately or integrally with the uppermost rib of the panel, according to the present invention.

Preferably, the closure panel or cover is constructed esssentially of synthetic material that is thin, pliable and provided with a plurality of transversely extending reinforcing ribs. By making the cover of synthetic material, the manufacture thereof is simplified and less expensive than would be the case with other conventional materials. Also, with a unitary type of single sheet construction, rattling noises and the like are avoided that are quite common with conventional revolving shutters.

Brief description of the drawing

Further objects, features and advantages of the present invention will appear from the following description of the accompanying drawing, in which:

FIGURE 1 is a view of a motor vehicle instrument panel that is provided with a storage compartment constructed according to the teachings of the present invention;

FIGURE 2 is a cross-sectional view taken along line II—II of FIGURE 1; and

FIGURE 3 is a partial cross-sectional view taken on line III—III of FIGURE 2.

Detailed description drawing

According to the present invention, a conventional type of motor vehicle may be provided with an instrument panel 1 that is installed in a conventional manner in the passenger enclosure. The instrument panel 1 is provided with a generally vertically extending front wall 2 that has a storage compartment opening 3. An inner space 4, accessible through the opening 3, constitutes a storage compartment 5. The storage compartment 5 is provided with a conventional cup shaped housing or stamping 6 that is made of sheet material, or the like. In the vicinity of the opening 3, the housing 6 is provided with a wall 7 that is secured, by means of rivets, adhesives or the like, to a flange 8 of an annularly extending shield 10 that extends around the opening 3 at the forward end of the housing 6. The rearward portion of the lower wall 7 is supported by means of a brace 9 that is rigidly attached to an extension of the shield 10. The shield 10 is provided with a flange 11 that, at its lower portion, extends downwardly and rearwardly to constitute the extension for mounting the brace 9. At its upper portion, the flange 11 is rigidly connected by a screw 13 to an angular section 12 of the instrument panel. The angular section 12 forms a portion of the stamping 14 that constitutes the upper portion of the instrument panel 1.

Below the opening 3, the lower portion of the flange 11 extends rearwardly and downwardly, as noted above, to constitute a cover sheet 15 that extends substantially parallel to and spaced from the lower wall 7 of the storage compartment 5. As shown in FIGURES 1 and 3, Z-shaped strips 16, 17 are attached to the flange 11 at the cover sheet 15 to form two oppositely disposed guide tracks 18, 19 that constitute channels facing each other from opposite sides of the opening 3. In addition to the screws 13, screws 20 are employed to mount the storage compartment to the wall 2 of the instrument panel 1. The screws 20 are provided with spacing sleeves 21, as shown in FIGURE 3. The shield 10 is held against vibrations by means of the resilient dampening strip 22 that is placed between the wall 2 of the instrument panel and the parallely extending portion of the Z-shaped strips 16, 17 respectively. Guide or sealing channel members 23 are inserted into the channels or U-shaped grooves of the guide tracks 18, 19. The members 23 guide and seal the edges of a closure panel or cover 24 that is movable between its closed position that extends fully across the opening 3 (as shown in FIGURES 1 and 2) to an open position in the guide tracks between the cover sheet 15 and the lower portion of the instrument panel 1, which may be considered as an extension of the guide tracks. The cover or closure 24 consists essentially of a thin, pliable wall portion 25 that is preferably constructed of synthetic material, for example, plastic. The wall portion 25 is provided with a plurality of reinforcing ribs 26, that extend generally perpendicular to the movement of the panels, that is generally perpendicular to the plane of FIGURE 2 and horizontal in FIGURE 1. Additionally, the wall portion 25 may be provided with a top reinforcing strip or ledge 27. The reinforcing ribs 26 and the reinforcing strip 27 may be integrally constructed with the wall portion 25 in a one piece molding operation. The ledge 27 is used to mount a handle 28 for manually moving the panel between its closed and open position. Locking means may be provided to hold the panel in its closed position; this is constituted by a permanent magnet 29 that is rigidly attached to the reinforcing strip 27 and a correspondingly located magnetizable part 30 that is rigidly attached to the flange 11 within a suitably shaped recess 31.

The above embodiments have been shown and described only as examples of the present invention; other modifications and embodiment according to the broad aspects of the invention are contemplated within the spirit and scope of the present invention as defined by the following claims.

I claim:

1. A storage compartment in the instrument panel of a motor vehicle, comprising: a generally cup shaped housing having an opening at its forward end; one piece cover means for selectively closing said opening at the forward end of said housing; said cover means having at least one panel and means for slidably mounting said panel for movement between a closed position extending across said opening and an open position removed from said opening; means for attaching said housing and said cover means to said instrument panel; said closure panel consisting essentially of a pliable synthetic wall portion integrally having a plurality of reinforcing ribs extending substantially perpendicular to the direction of sliding movement between said closed position and said open position; and said means for mounting including two guide track means mounted on two opposite sides of said opening to receive and guide said closure panel between said closed and said open positions; guide track means constitute means for supporting and reinforcing the walls of said housing; one of said reinforcing ribs having a handle; means for locking said panel in its closed position and being at least partially mounted on one of said reinforcing ribs; an annular shield member surrounding said opening on all sides and that includes two guide track means; said track means following the contour of said opening and the immediate adjacent portions of said instrument panel; said instrument panel having a substantially vertical portion adjacent and substantially parallel with said opening, and a connected lower portion extending spaced from and substantially parallel to the lower wall of said housing; said shield member extending substantially parallely between said lower wall and said lower portion; brace means extending between and rigidly attached to the rearward portion of said lower wall and said shield member; said guide track means having extensions between said lower wall and said lower portion, and said lower portion forming a cover entirely covering the upper portion of said track guide extensions; said attaching means including a screw threaded fastener extending through said instrument panel and said shield, and a spacing sleeve surrounding said fastener between said instrument panel and said shield; said guide track means each including a track strip secured by said fastener adjacent to said shield to form therewith a channel; each of said track guide means including a U-shaped cross section channel member receiving a corresponding edge of said closure panel and being mounted within said channel; said locking means including a permanent magnet part and a mating magnetizable part; said shield having a recess formed in its uppermost portion; one of said parts being rigidly attached within said recess and the other of said parts being attached to the uppermost portions of said panel.

2. The device of claim 1, wherein said handle extends over the entire length of said one of said reinforcing ribs.

3. The device of claim 1, wherein said handle is separate from said one of said reinforcing ribs and includes means for rigidly attaching itself to one of said reinforcing ribs.

References Cited

UNITED STATES PATENTS

| | | | |
|---|---|---|---|
| 2,791,346 | 5/1957 | Tell | 206 |
| 2,508,305 | 5/1950 | Teetor | 206 |
| 2,735,597 | 2/1956 | Treleven | 206—19.5 |
| 2,155,962 | 4/1939 | Visser | 206 |
| 228,627 | 6/1880 | Gordon | 206 |

PHILIP GOODMAN, *Primary Examiner.*